(No Model.)

R. D. JACOBUS.
WEAR IRON FOR CARRIAGES.

No. 436,907. Patented Sept. 23, 1890.

WITNESSES:
Oscar A. Michel.
L. H. Scott.

INVENTOR:
Roswell D. Jacobus,
BY Draker & Co., ATTY'S.

UNITED STATES PATENT OFFICE.

ROSWELL D. JACOBUS, OF LITTLE FALLS, NEW JERSEY.

WEAR-IRON FOR CARRIAGES.

SPECIFICATION forming part of Letters Patent No. 436,907, dated September 23, 1890.

Application filed May 21, 1890. Serial No. 352,595. (No model.)

*To all whom it may concern:*

Be it known that I, ROSWELL D. JACOBUS, a citizen of the United States, residing at Little Falls, in the county of Passaic and State of New Jersey, have invented certain new and useful Improvements in Wear-Irons for Carriages; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a wear-iron for carriages and other vehicles which shall be effective and durable in construction and operation, and free from certain objections inherent in wear-irons heretofore produced.

The invention consists in the improved wear-iron and in the combination and arrangement of the several parts thereof, as hereinafter set forth, and finally pointed out in the claim.

Figure 1:
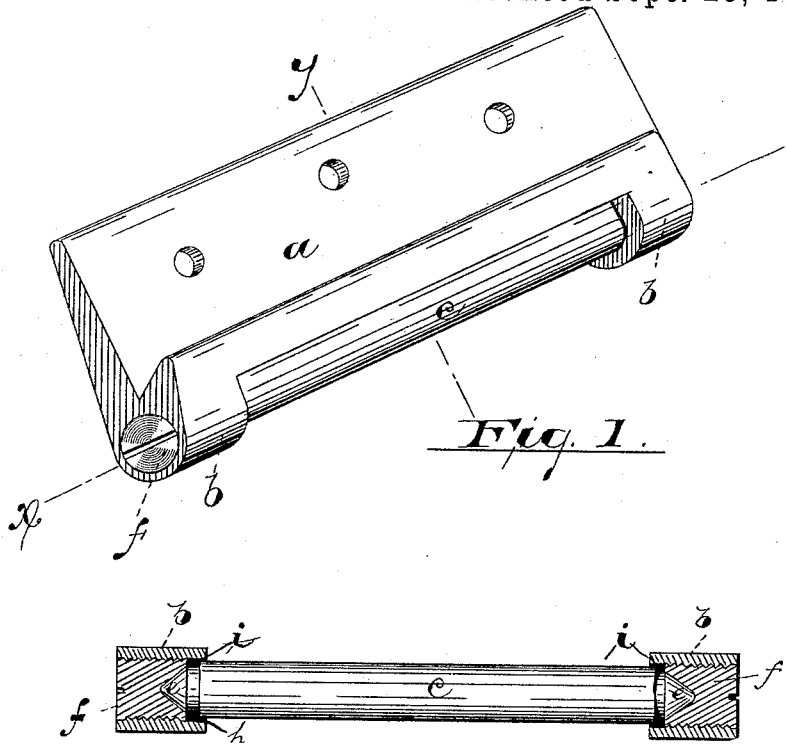
Figure 2:
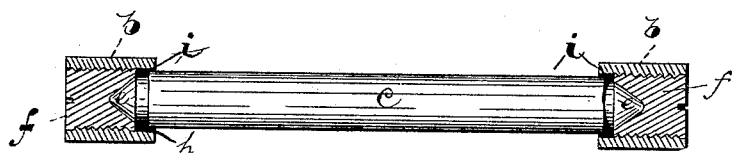
Figure 3:
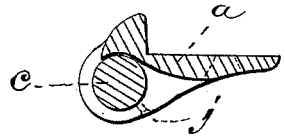

Referring to the accompanying drawings, Figure 1 represents a plan view in perspective; and Fig. 2 a longitudinal section taken through line X of said Fig. 1, showing my improved wear-iron. Fig. 3 is a section taken through line Y of Fig. 1.

Similar letters of reference indicate corresponding parts wherever they occur.

In said drawings, $a$ indicates an angle-plate provided with bearings $b$ at each end for the reception of a cylindrical bar or roller $c$, having conically formed ends $e$. $f$ indicates screws or plugs adapted to screw into the outer ends of the bearings aforesaid, and provided with conically-formed sockets upon their inner ends adapted to receive the ends of said cylindrical bar and to form adjustable bearings therefor, as indicated in Fig. 2.

At or near the ends of said cylindrical bar are formed shoulders $h$ and horizontal bearings adapted to receive packing-rings $i$, which packing-rings are interposed between said shoulders and the ends of the said screws or plugs $f$, above referred to, for the purpose of preventing dirt from getting into the bearings and the leakage of the lubricator. Said bearings are provided with threaded perforations to receive set-screws $j$ and to admit the flow of a lubricant to said bearings. Said set-screws serve to hold the screws $f$ and prevent them from working loose, as will be understood. Said angle-plate is rounded off between the bearings, as indicated in Fig. 3, to provide for the free escape of any dirt or other substance which may get behind the cylindrical bar and prevent the clogging of the same. Said bar is not designed to have any bearing upon the central portion of said angle-plate between the bearings at the ends, a slight space being left between said portion of the angle-plate and said cylindrical bar, thereby avoiding friction, as will be manifest.

The screws $f$ may be tightened up at any time by a screw-driver to take up any lost motion.

Having thus described my invention, what I claim as new, and desire to secure by Letters Patent of the United States, is—

A wear-iron for vehicles, consisting of an attaching-plate having bearings at each end, screws or plugs in said bearings, a cylindrical bar having its ends journaled in said plugs and having an angular shoulder near its ends, forming annular angular channels between the plugs and the ends of the bar, packing-rings arranged in said annular angular channels, and oil-ducts provided with closing-screws leading to the bearings of the bar, substantially as described.

In testimony that I claim the foregoing I have hereunto set my hand this 22d day of April, 1890.

ROSWELL D. JACOBUS.

Witnesses:
OLIVER DRAKE,
OSCAR A. MICHEL.